United States Patent [19]

Wingerden

[11] Patent Number: 5,131,185
[45] Date of Patent: Jul. 21, 1992

[54] APPARATUS AND METHOD FOR PROPAGATING, GROWING AND HANDLING PLANTS

[76] Inventor: Aart V. Wingerden, Rte. 2, Fletcher, N.C. 28732

[21] Appl. No.: 751,678

[22] Filed: Aug. 23, 1991

Related U.S. Application Data

[63] Continuation of Ser. No. 430,143, Nov. 1, 1989, abandoned.

[51] Int. Cl.$^5$ ............................................. A01G 9/02
[52] U.S. Cl. .......................................... 47/86; 47/73; 47/901
[58] Field of Search .................... 47/85, 86, 87, 65, 77

[56] References Cited

U.S. PATENT DOCUMENTS

| | | | |
|---|---|---|---|
| 2,640,623 | 6/1953 | Ryder | 47/87 |
| 3,386,608 | 6/1968 | Diller | 47/87 |
| 4,118,892 | 10/1978 | Nakamura | 47/86 |
| 4,213,274 | 7/1980 | Skaife | 47/86 |
| 4,926,586 | 5/1990 | Nagamatsu | 47/86 |
| 4,926,587 | 5/1990 | Van Wingerden | 1/1 |

FOREIGN PATENT DOCUMENTS

| | | | |
|---|---|---|---|
| 2112753 | 6/1972 | France | 47/77 |
| 2509125 | 1/1983 | France | 47/86 |
| 2093326 | 9/1982 | United Kingdom | 47/87 |
| 2190359 | 11/1987 | United Kingdom | 47/86 |

*Primary Examiner*—Henry E. Raduazo
*Attorney, Agent, or Firm*—Carter & Schnedler

[57] ABSTRACT

There is provided an apparatus and method for propagating, growing and handling plants. A tray is provided having a pluralilty of spaced apart elongated containers which are removably attached to one another. Each container has a plurality of planting compartments with adjacent planting compartments being separated by an air compartment each having an elongated opening which permits the movement of air into the root system of a plant located in an adjacent compartment. The air compartments also provide for vertical airflow to the leafy parts of the plants. The elongated containers are readily separated from one another and reassembled using automated apparatus. The automated apparatus removes the plants from the container for grading, transplanting and/or packaging.

16 Claims, 8 Drawing Sheets

APPARATUS AND METHOD FOR PROPAGATING, GROWING AND HANDLING PLANTS

This is a continuation of copending application Ser. No. 0/430,143 filed on Nov. 1, 1989 now abandoned.

BACKGROUND OF THE INVENTION

This invention relates to plant propagating containers and methods of growing plants in such containers. More particularly it relates to trays used for growing plants to a certain stage and for grading, transplanting and/or packaging such plants.

The majority of young plant trays which are currently on the market are constructed using a single piece of preformed plastic material having a plurality of individual growing compartments in columns and rows. It has been found that this type of tray presents difficulties when the grower attempts to transplant the plants. Since the transplanting process is not mechanized using that type of tray, the time consuming, inaccurate and expensive manual method is used. Furthermore, the plants are often either overwatered or underwatered and the roots often grow in an unhealthy spiral fashion. Growth is also retarded because of the lack of air movement to the root system as well as around the leafy portion of the plants. Also, roots from plants in adjacent compartments sometimes grow together, particularly when soil is spilled on top of the tray.

U.S. Pat. No. 4,453,344 (now Reissue 32,808) invented by Aart Van Wingerden represents a significant advancement over the standard one piece growing tray. Van Wingerden teaches the concept of introducing air upwardly through the tray by using elongated holes or air compartments near the growing compartments to promote growth and development of the plants. The compartments are formed by adjacent sinuous strips. Van Wingerden also teaches the concept of introducing air into the length of the growing compartment which allows for a significant increase level of root ball aeration which contributes to beneficial growth and development of the plants when compared to conventional growing trays. The vertical airflow process between growing compartments and the increased root ball aeration within the growing compartments provide significant biological benefits to plant productivity including higher growth rates, more biomass, improved root morphology through air pruning of roots and the production of a more fibrous root system and the elimination of spiraled roots, increased plant hardiness through increases in lignin formation, cuticle thickness and less disease, and better performing plants after transplant. Furthermore, Van Wingerden broadly discloses the mechanization of removing the plant from the tray for transplanting.

While the Van Wingerden tray described above represents a significant advancement, the specific embodiment described therein showing sinuous strips, however, has several drawbacks. One drawback is that while the sinuous strip design permits a certain amount of mechanization in transplanting, the strips are difficult to handle and manual labor may be required, for example, in bringing the strips apart at a certain rate so as to permit the plants to drop one at a time from between the strips. Furthermore, other desirable results of mechanization such as grading and packaging are not discussed in the previous Van Wingerden patent. Furthermore, the root ball aeration as a result of the airflow between the contact point of adjacent strips could be improved. Also, soil can lodge between the contact points of adjacent strips which keeps the strips from fitting together properly.

OBJECTS OF THE INVENTION

It is therefore one object of this invention to provide an improved method and apparatus for propagating, growing and handling plants.

It is another object to provide a method and apparatus for propagating, growing and handling plants which utilizes the principles of vertical airflow and root ball aeration which affords significant biological benefits to the plant and which enables efficient mechanization for transplanting, grading, and/or packaging the plants.

It is still another object to provide a method and apparatus for propagating and growing plants in a growing tray and for transplanting, grading, and/or packaging such plants.

SUMMARY OF THE INVENTION

In accordance with one form of this invention there is provided a tray for receiving a plurality of plants. The tray includes at least one elongated container. The container has two spaced apart elongated sidewalls and a plurality of spaced apart growing compartments for containing plants and growing material. Portions of the elongated sidewalls form individual walls for each of the growing compartments. The container includes a plurality of spaced apart air compartments. At least one of the air compartments is located between adjacent growing compartments so that air will flow upwardly to the part of the plants which extends out of the growing material. Each of the growing compartments are separated from an adjacent air compartment by a barrier which prevents root growth from one growing compartment to another. The barrier is constructed so as to permit airflow from it to at least one of its adjacent growing compartments.

In the preferred form, a plurality of such elongated containers are provided to form the tray. Adjacent containers are attached to one another by a mechanism which keeps adjacent containers spaced apart. Thus more air may flow vertically between adjacent containers to the upper parts of the plants. The plants, including the roots and the upper portion are substantially surrounded by moving air, thereby producing more vigorous, hardier, faster growing plants with improved morphology.

In accordance with another form of this invention, there is provided a method and apparatus for removing plants from the tray formed from the above-described containers which are removably attached to one another for grading, transplanting and/or packaging said plants. Each container is separated from the tray and the separated container is moved away from the tray. The individual plants are pushed from their compartment in the container and the plants are transplanted. The spacing between the adjacent containers aids in the ability to mechanically separate the containers and prevents damage to the upper portions of the plants during removal of the plants from a container. Once the plants have been removed the empty containers may be reassembled for subsequent reuse.

BRIEF DESCRIPTION OF THE DRAWINGS

The subject matter which is regarded as the invention is set forth in the appended claims. The invention, together with further objects and advantages thereof, may be better understood in reference to the following description taken in conjunction with the attached drawings wherein:

DESCRIPTION OF THE PREFERRED EMBODIMENT

Figure 1:
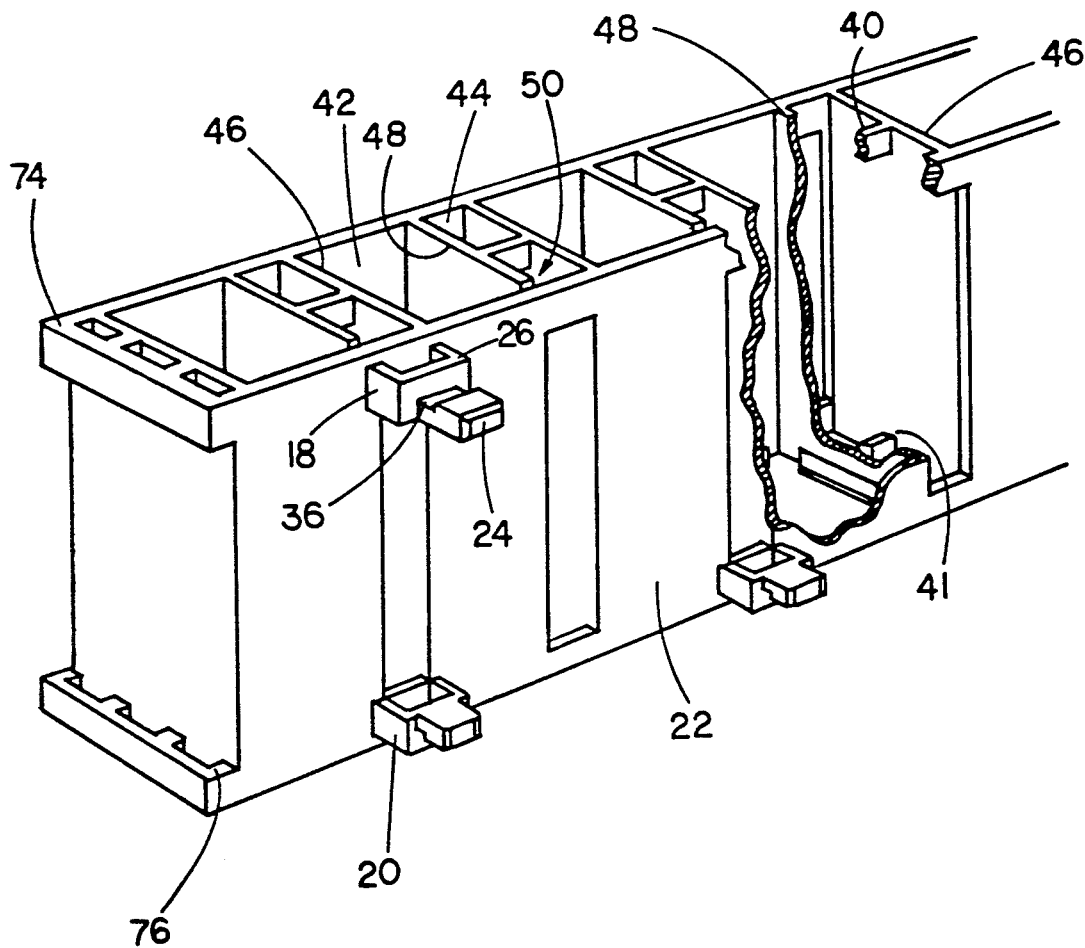
FIG. 1 is a partial perspective view of a plant container strip with a portion cut away, embodying one form of this invention.
Figure 3:
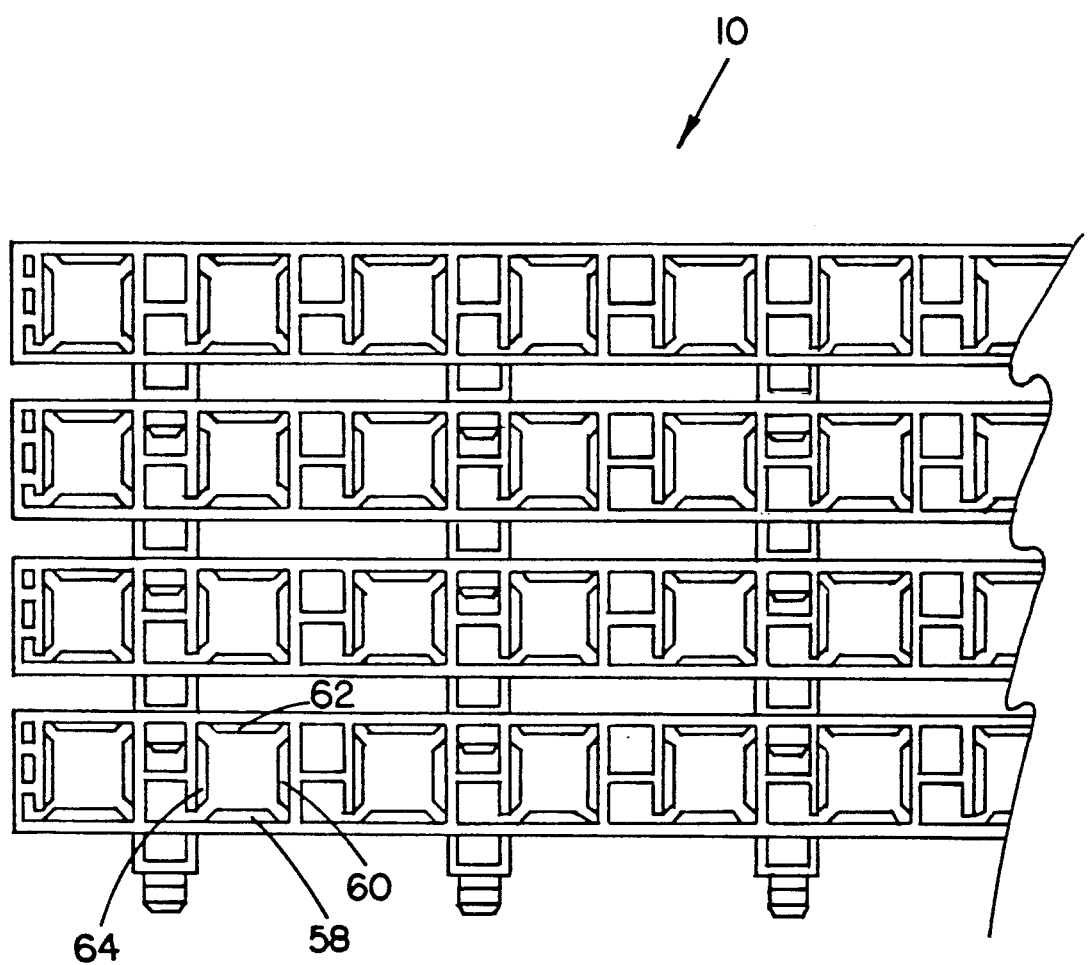
FIG. 3 is a partial top view showing a plurality of the strips of FIG. 1 attached together forming a tray.

Referring now more particularly to FIGS. 1 and 3, there is provided plant growing tray 10 having a plurality of multi-compartment spaced apart plant container strips 12, 14, 15, and 16, each of which are identically constructed preferably of molded plastic material. Each strip includes elongated wall 22 and parallel elongated wall 32. The strips are held together in the form of a tray by a plurality of clips 18 and 20 which project from wall 22 of each strip. The clips 18 form a row along the upper level of wall 22 while clips 20 form a row along the lower level of wall 22. The clips include connectors 24 and spacers 26.

Figure 2:
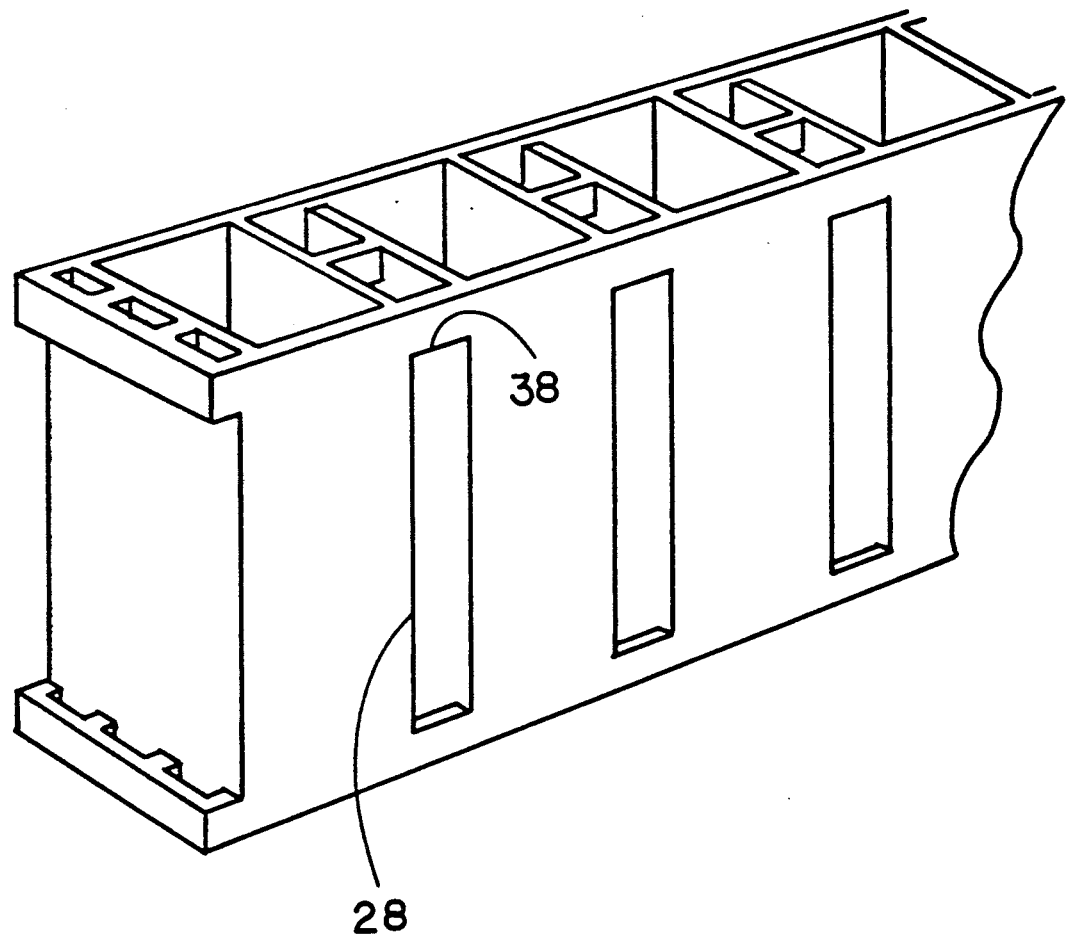
FIG. 2 is a partial perspective view showing the other side of the strip of FIG. 1.

As seen in FIG. 2, connectors 24 are received in elongated holes 28 which are formed in wall 32 of each strip. Holes 28 also function as air conductors which will be explained more fully below. The holes and clips of adjacent strips align with one another. Shoulder 36 holds the strips in place and against the outside surface 38 of wall 32.

Each strip includes a plurality of growing compartments 42 with adjacent growing compartments being separated from one another by air compartments 44. Preferably the tray is located on an open mesh screen tables or rails (not shown) and each air compartment is open on both ends to permit the vertical movement of air therethrough.

Each air compartment is formed by partitions 46 and 48. Partition 48 contacts sidewall 32 but does not contact sidewall 22 providing gap 50 between partition 46 and sidewall 22. Partition 46 contacts sidewalls 22 and 32 and forms a wall for the growing compartment 42. Gap 50 provides airflow into growing compartments 42 enabling aeration of the roots, thus providing a more healthy plant. Furthermore, by utilizing an air compartment between growing compartments, it has been found that the roots from the plants in adjacent growing compartments do not grow together.

Each air compartment includes an upper beam 40 and a lower beam 41 connected between partitions 46 and 48 which provides stiffness and support. Each growing compartment 42 is open at the bottom and includes tabs 58, 60, 62 and 64 which extend into the bottom portion of the compartment to provide support for the growing material. Tab 58 is attached to the lower portion of side wall 22, tab 60 is attached to partition 48, tab 62 is attached to sidewall 32, and tab 64 is attached to partition 46. The resulting opening 66 permits air to flow into the bottom portion of the root ball and furthermore permits the root ball to properly drain excess water.

Figure 4:
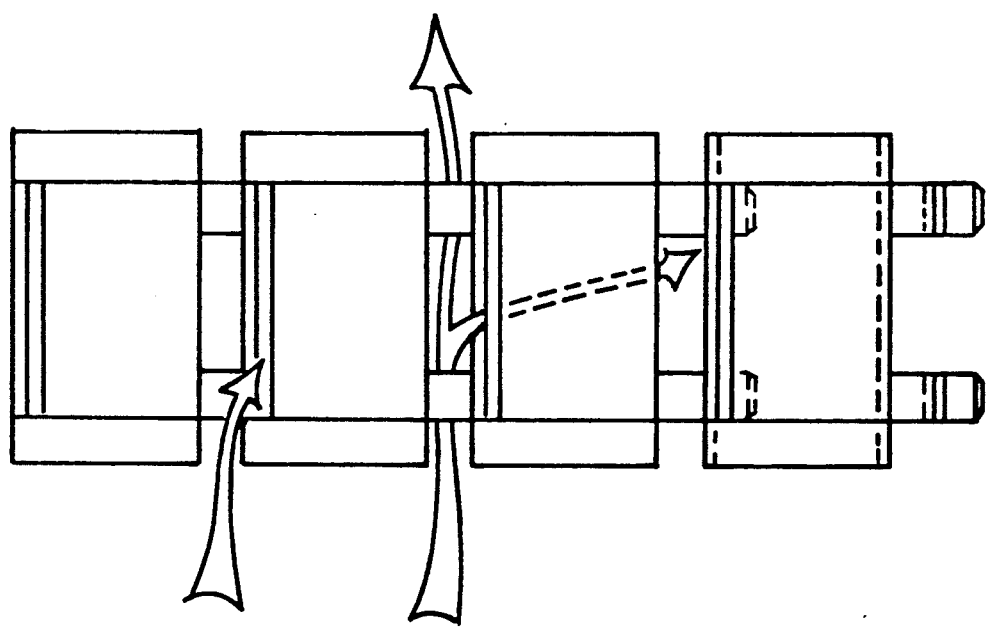
FIG. 4 is a front elevational view of the tray of FIG. 3 showing some of the movement of air through the tray.
Figure 5:
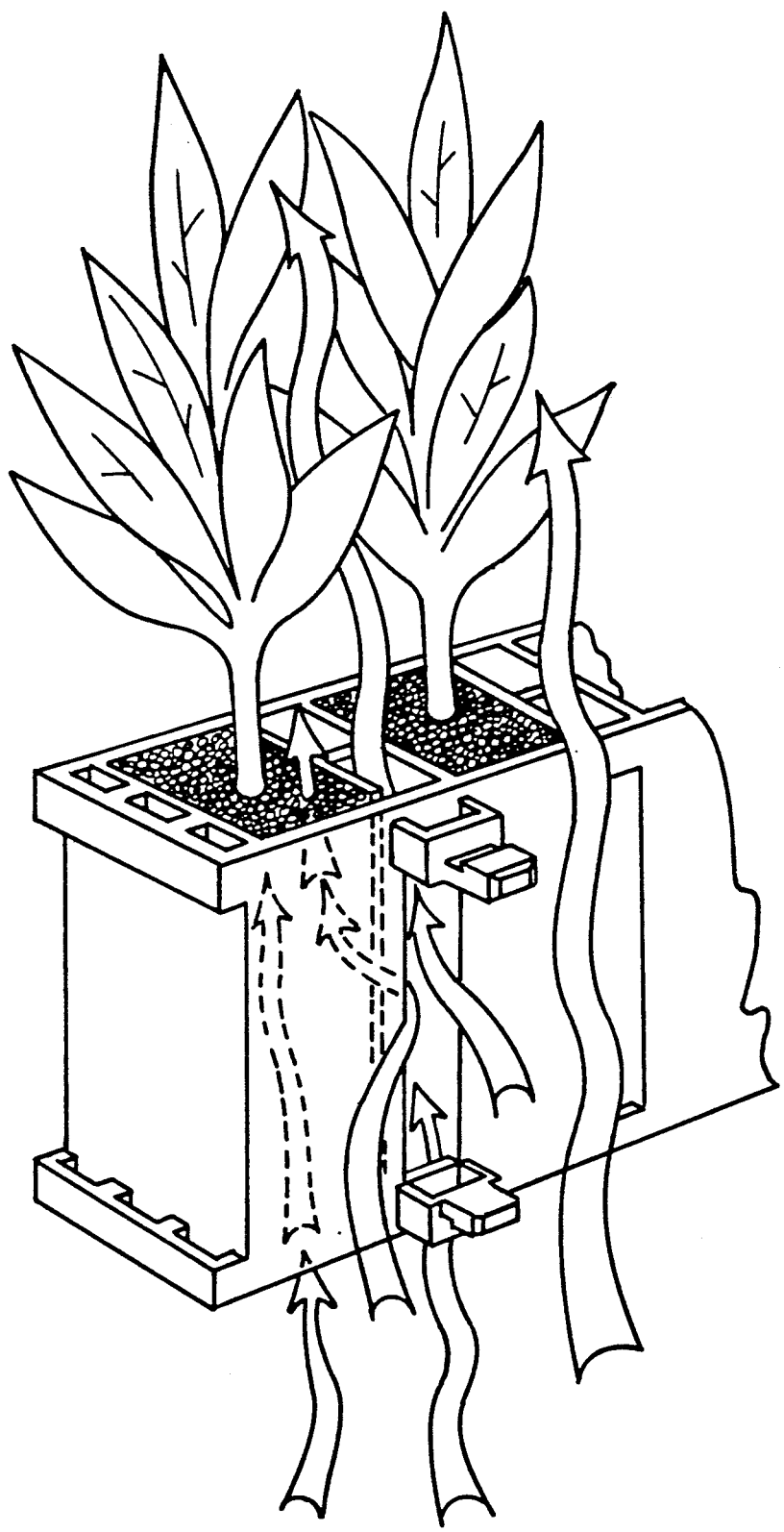
FIG. 5 is a partial perspective view of the strip of FIG. 1 with plants contained therein showing some of the movement of air through and around the strip.

As stated previously the tray 10 shall be elevated from the ground so that air may move upwardly through the tray as shown by the arrows in FIGS. 4 and 5. Air will move upwardly in the gaps 68 between adjacent strips which are created by spacers 26 of clips 18 and 20 so as to provide air on the two opposing sides of each strip. Air also rises along the outside wall 70 of each outer strip in a tray. Furthermore, air will travel from the bottom of each air compartment 44 to the upper portions of the plants thereby providing air to each plant from four sides.

By including vertical openings 28 in each sidewall 22 and 32 for each air compartment, an even greater amount of air may be introduced into the air compartments and to the roots via elongated gap 50 thereby providing additional air for root ball aeration and vertical airflow to the leafy part of the plants.

End sections 74 and 76 at each free end of a strip are exactly one half of the width of air compartment 44 plus the thickness of partition 48 thus permitting the strips to be placed end to end such that the center to center spacing between adjacent growing compartments remains the same to aid in the mechanization of transplanting which will be explained below.

Figure 6:
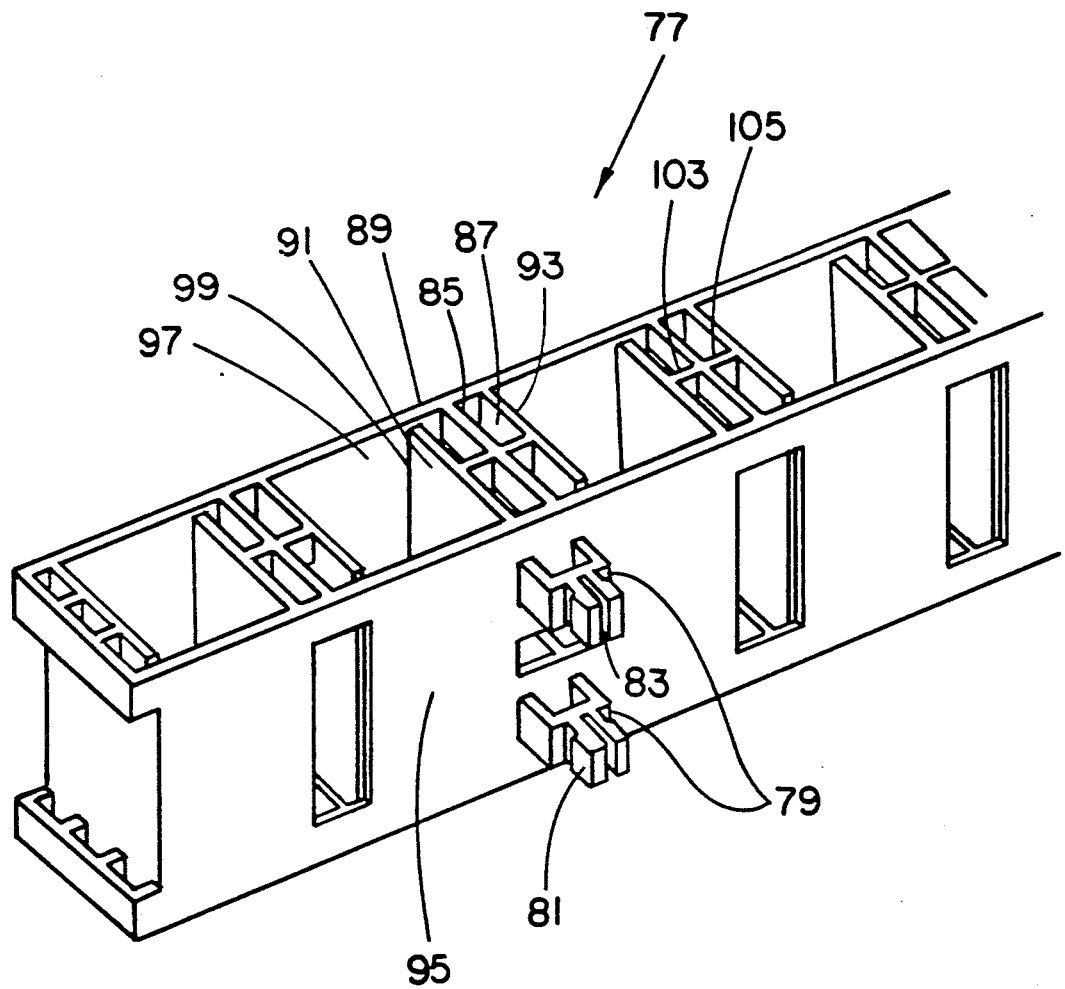
FIG. 6 is a partial perspective view of an alternative embodiment of the strip of FIG. 1.

FIG. 6 shows an alternative embodiment to the strip shown in FIG. 1. Strip 77 is identical to strip 12 except for the construction of portions of the air compartments and portions of the clips. Clips 79 have connectors 81 which are split in halves by slots 83. Slots 83 of the upper connections are received by a portion of beam 85 which is located in air compartment 87, and slots 85 of the lower connector are received by an identical beam (not shown) in the lower part of the air compartment through openings in side 89.

Air compartment 87 includes partitions 91 and 93 each of which forms a wall for adjacent growing compartments. Partition 91 is connected to side 95 substantially along its entire width but is not connected to side 97 thereby forming an elongated air slot 99 which is the same as air slot 50 shown in FIG. 1. An identical air slot 101 is located between partition 93 and side 95. Thus, by using the embodiment of FIG. 6 air is introduced to the root system on two sides of each root ball. Beams 103 and 105 bridge beam 85 and partitions 91 and 93 to add strength. Identical beams (not shown) are located in the lower part of each air compartment 87.

Figure 7:
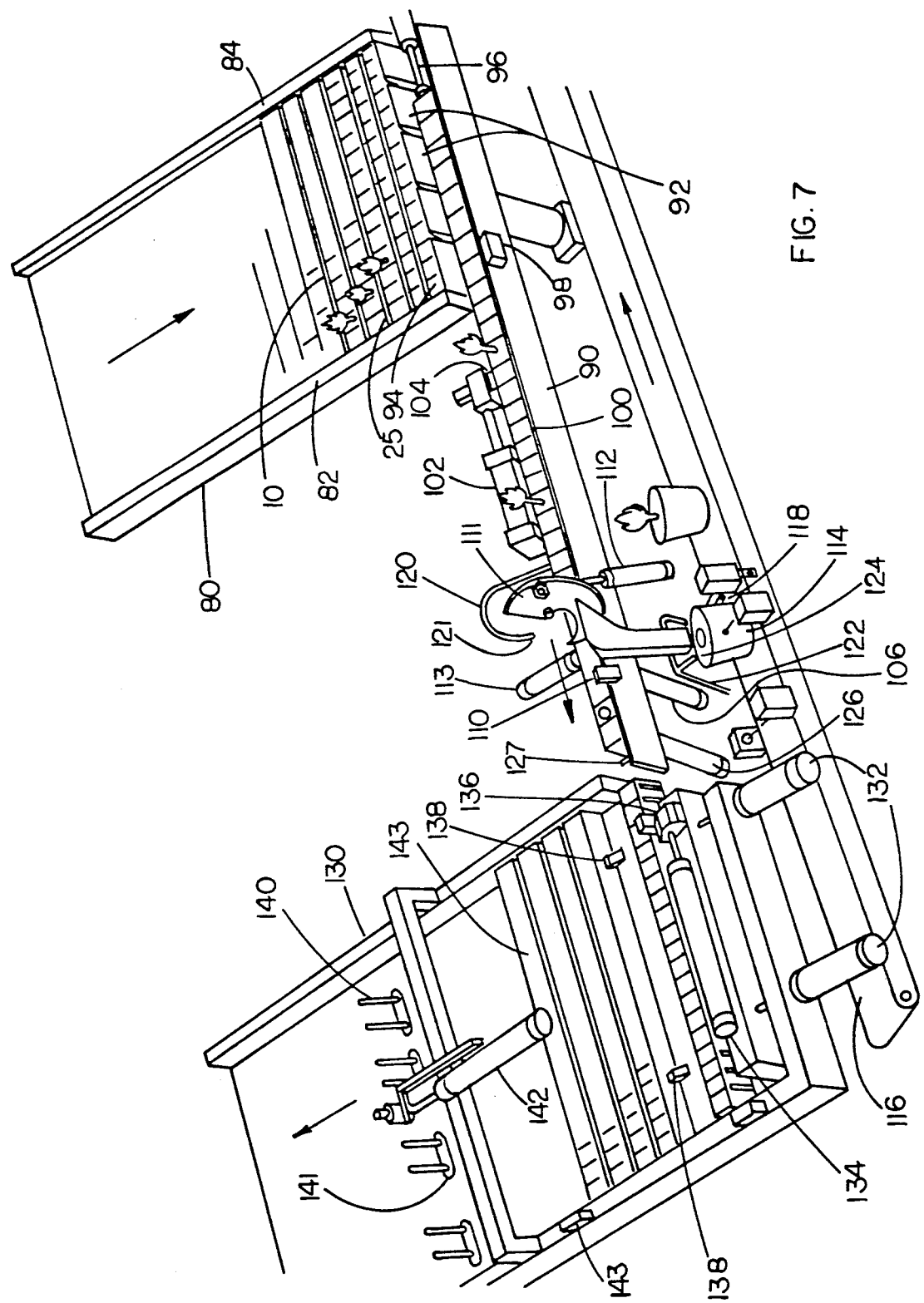
FIG. 7 is a perspective view of apparatus which may be utilized to provide a method of transplanting plants into pots from the tray shown in FIG. 3.
Figure 8:
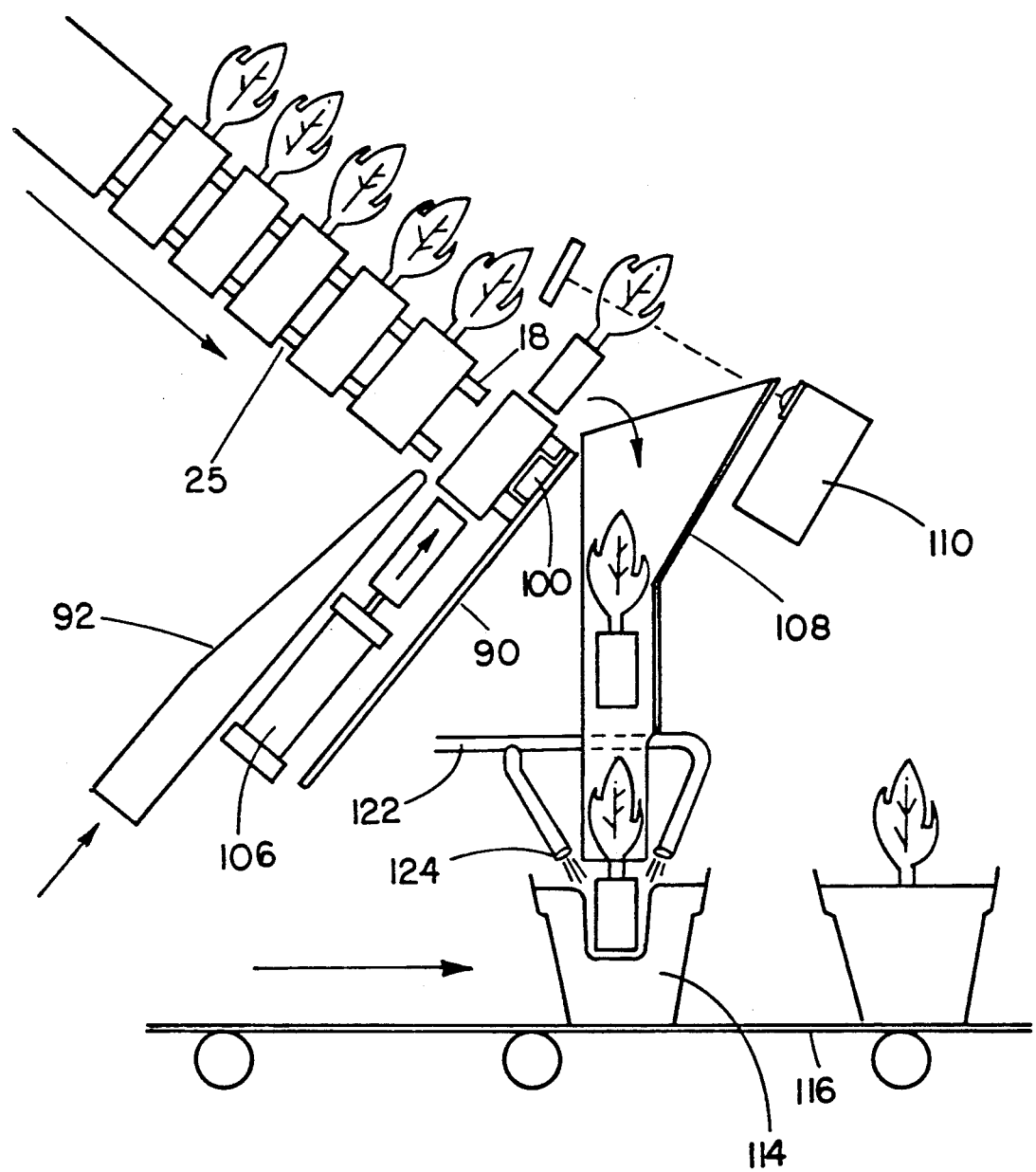
FIG. 8 is a side view of a portion of the apparatus shown in FIG. 7 showing details of the strip separator and planting section of the apparatus.

The transplanting of young plants from the above described trays and strips will be better understood in reference to FIGS. 7 and 8. FIG. 7 is a schematic showing an apparatus which may be used to transplant the plants from the tray shown in FIG. 3. Tray 10 normally consists of 13 strips connected together by clips 18. Tray 10 is placed on inclined platform 80. Guides 82 and 84 are connected to platform 80 and keeps the tray, and thus the strips aligned as each strip is separated from the remaining part of the tray and gravity fed onto rail 90. Five separator blades 92 are located adjacent the lower end of plate 80. The separator blades are wedge shaped and are pressed into gap 25 between adjacent strips formed by the spacer portion of the clips 18 so as to separate the lowest strip 94 from the remainder of the tray 10. The lowest strip then drops by gravity onto rail 90 and is pushed along the rail by air cylinder 96 which responds to sensor 98 which senses that a strip has been dropped onto rail 90.

A plurality of strips lie along rail 90 and abut one another end to end. Rail 90 includes lip guide 100 upon which the top clip 18 of each strip rests. Indexing piston 102 is located behind rail 90 and includes finger 104 which is received in each air window 28 of each strip and pulls or indexes each strip along rail 90 a distance equal to the center to center distance between adjacent growing compartments.

Plant pusher cylinder 106 is located below rail 90 and aligns with funnel 108. Photocell sensor 110, which is attached to rail 90, indicates whether or not a properly sized plant is located in a plant compartment adjacent to the plant pusher cylinder 106 so as to activate plant pusher cylinder. A plant leaf separator blade 111 is connected to cylinder 112 and is used to ensure that the leaves on adjacent plants are separated from one another at the time a plant is pushed out of its growing compartment and into funnel 108. The separator 110 rotates to the upward position thus separating the leaves in response to the indexed movement of the strips along the rail. Stabilizing cylinder 113, which is located adjacent rail 90, causes a piston to be inserted into each air slot 28 at the time that cylinder 106 causes a piston to be inserted into a growing compartment, thus stabilizing the strip while the plant is ejected.

Pots 114 are located on conveyor belt 116. Pot stopper air piston 118 is located above the belt and below and to the side of funnel 108 and comes on in response to photocell 110 to hold a pot 114 centered below the lower portion of funnel 108. Air tube 120 has its free end 122 located above funnel 108 and comes on when a plant is received in the funnel so as to ensure that the plant passes through the lower end of the funnel and into pot 114. A watering hose 122 has free end 124 mounted above the upper level of pot 114 and waters the plant when a pot receives a plant through funnel 108. A second plant pusher cylinder 126 is located below rail 90 and is used to push out any remaining plugs or immature plants in the strip which become waste. The second plant pusher cylinder comes on in response to each indexed movement of the strip.

Because of photocell 110 and the two plant pushers, the transplanting apparatus also acts as a plant grader in that only mature healthy plants are planted while the remaining unhealthy plants or smaller plants in a growing compartment are pushed out as waste.

Rail 90 is connected to a second inclined plate 130. Inclined plate 130 is used to collect empty strips and to reassemble the empty strips into a 13-strip tray. A pair of strip pusher cylinders 132 are connected to the lower portion of plate 130. A strip puller cylinder 134 is attached to plate 130 and includes hook 136 which grabs a portion of an oncoming strip and pulls it onto the plate in response to sensor 137 which indicates that a strip has arrived adjacent to the plate. After a strip is pulled into place at the bottom of plate 130, strip pusher cylinder 132 pushes the strip upwardly above latches 138 which hold the strips in a position above the latches. When the 13th tray is received on the plate 130 and above latches 138, spikes 140 come up through holes 141 in the plate in response to sensor 143 and the pusher cylinder 132 presses the strips together with the top strip 143 forced against the spikes thereby locking the connectors 18 and 26 in one strip into holes 28 of an adjacent strip thus forming a completed empty tray. After the tray is formed, tray pusher cylinder 142 pushes the tray off of the plate and into a tray receiving area (not shown) after which the trays are reused.

The preferred embodiment of this invention has been described using specific terms. Such description is for illustrative purposes only and it is understood that changes may be made without departing from the true spirit and scope of the following claims.

I claim:

1. A tray for receiving a plurality of plants comprising:
    a plurality of rows of elongated containers; said rows of containers being nonintegral with one another; each of said containers including (a) two spaced apart elongated side walls, (b) a plurality of spaced apart growing compartments for receiving plants and growing material, (c) a plurality of spaced apart air compartments, (d) an air compartment located between each of said spaced apart growing compartments, each air compartment having a top portion and a bottom portion, said top portion and said bottom portion being substantially open thereby enabling air to readily pass through said air compartments, and (e) a barrier formed by a common wall between an air compartment and one of its adjacent growing compartments, said barrier being constructed so as to permit airflow into said adjacent growing compartment from said air compartment, thereby enabling air pruning of roots of the plant in said growing compartment, said growing compartments having a top portion and a bottom portion, said top portions and said bottom portions of said growing compartments being substantially open thereby enabling the ready removal of said plants from said growing compartments and further enabling additional air pruning of roots of the plants in said growing compartments.

2. A tray as set forth in claim 1 further including a plurality of said elongated containers; said tray formed of rows of removably attached adjacent containers; said adjacent containers being spaced apart whereby air may flow between adjacent containers to upper portions of the plants.

3. A tray as set forth in claim 2 further including connection means attached to at least one of said elongated sidewalls of each of said containers for removably fastening said containers together and for providing space between said containers, whereby said tray may be readily separated and reassembled.

4. A tray as set forth in claim 1 further including a second barrier formed as a common wall between each of said spaced apart air compartments and another adjacent growing compartment; said second barrier being constructed so as to permit airflow from said each air compartment to said another adjacent growing compartments.

5. A tray as set forth in claim 1 further including openings in said sidewalls adjacent to a plurality of said air compartments thus permitting the movement of air into air compartments.

6. A tray as set forth in claim 5 of further including a plurality of connectors projecting from one of said sidewalls; some of said openings in said sidewalls receiving said connector.

7. A tray as set forth in claim 4 further including bridging means connected between said barriers in each of said air compartments; said bridging means extending above and below said openings in said sidewalls.

8. A tray for receiving a plurality of plants comprising:

a plurality of elongated containers; each of said containers having two spaced apart elongated side walls; a plurality of spaced apart growing compartments for receiving plants and growing material; portions of said elongated side walls forming individual walls for each of said growing compartments; a plurality of spaced apart air compartments; an air compartment located between each of said spaced apart growing compartments; each air compartment having a top portion and a bottom portion, said top portion and said bottom portion being substantially open thereby enable air to readily pass through said air compartments; a barrier formed by a common wall between an air compartment and one of its adjacent growing compartments; said barrier being constructed so as to permit airflow into said adjacent growing compartments from said air compartment, thereby enabling air pruning of roots of the plant in said growing compartment; said growing compartments having a top portion and a bottom portion; said top portion and said bottom portions of said growing compartments being substantially open thereby enabling the ready removal of said plants from said growing compartments and further enabling additional air pruning of roots of the plants in said growing compartments; said tray formed of rows of removably attached adjacent containers; said adjacent containers being spaced apart whereby air may flow between adjacent containers to upper portions of the plants; connection means attached to at least one of said elongated side walls of each of said containers for removably fastening said containers together and for providing space between said containers whereby said containers may be readily separated and reassembled; a plurality of holes located in at least one of said elongated side walls, at least some of said holes align with said connection means and removably receiving said connection means.

9. A tray for receiving a plurality of plants comprising:

at least one elongated container; said container having two spaced apart elongated side walls; a plurality of spaced apart growing compartments for receiving plants and growing material; portions of said elongated side walls forming individual walls for each of said growing compartments; a plurality of spaced apart air compartments; an air compartment located between each of said spaced apart growing compartments; each air compartment having a top portion and a bottom portion; said top portion and said bottom portion being substantially open thereby enabling air to readily pass through said air compartments; a first barrier formed by a common wall between an air compartment and one of its adjacent growing compartments; said first barrier being constructed so as to permit airflow into said adjacent growing compartment from said air compartment thereby enabling air pruning of roots of the plant in said growing compartment; said growing compartments having a top portion and a bottom portion; said top portions and said bottom portions of said growing compartments being substantially open thereby enabling the ready removal of said plants from said growing compartments and further enabling additional air pruning of roots of the plants in said growing compartments; a second barrier located in each air compartment; said second barrier contacting opposed sides of said spaced apart side walls for stabilizing said container.

10. A tray for receiving a plurality of plants comprising:

a plurality of rows of growing containers; said rows being nonintegral with one another; each of said containers including (a) two spaced apart elongated side walls, (b) a plurality of spaced apart growing compartments for receiving plants in growing material, portions of said elongated side walls forming individual walls for each of said growing compartments, (c) a plurality of spaced apart air compartments, (d) an air compartment located between each of said spaced apart growing compartments, (e) a barrier formed by a common wall between an air compartment and one of its adjacent growing compartments, said barrier being constructed so as to permit airflow into said adjacent growing compartment from said air compartment, said common walls having portions thereof not being in contact with one of said side walls forming an air gap.

11. A tray for supporting a plurality of plants comprising:

a plurality of elongated containers formed as rows; said rows being nonintegral with one another; each container having a plurality of growing compartments and a plurality of air compartments; each container having two spaced apart side walls; an air compartment located between adjacent growing compartments; each air compartment having an upper part and a lower part; at least one opening in said lower part of each of said air compartments whereby air may flow vertically through said air compartments; said growing compartments having a top portion and a bottom portion; said top portion and said bottom portion of each growing compartment being substantially open wherein air pruning of the roots of the plants may occur and the plants may be readily removed from said growing compartments; means for maintaining adjacent containers a predetermined distance from one another thereby providing an open space between said adjacent containers whereby air may flow vertically between said adjacent containers.

12. A tray as set forth in claim 11 wherein said means for maintaining adjacent containers a distance from one another includes a plurality of connectors extending from one sidewall of each of said containers; said connectors contacting the sidewall of an adjacent container; said connector enabling said container to be repeatedly separated and reassembled.

13. A tray as set forth in claim 11 wherein said connectors are constructed so as to be readily removed from contact with the sidewalls of said adjacent container whereby each container in said tray may be removed from said tray.

14. A tray as set forth in claim 11 further including an opening in each of said spaced apart sidewalls of each container adjacent to the end of said air compartments.

15. A tray for supporting a plurality of plants comprising:

a plurality of elongated containers formed as rows; each container having a plurality of growing compartments and a plurality of air compartments; each container having two spaced apart side walls; an air compartment located between adjacent growing compartments; each air compartment having an upper part and a lower part; at least one opening in said lower port of each of said air compartments whereby air may flow vertically through said air compartments; said growing compartments having a top portion and a bottom portion; said top portion and said bottom portion of each growing compartment being substantially open whereby air pruning of the roots of the plants may occur and said plants may be readily removed from said growing compartments; means for maintaining adjacent containers a predetermined distance from one another thereby providing an open space between adjacent containers whereby air may flow vertically between said adjacent containers; openings in each of said spaced apart side walls of each container adjacent to said air compartments; said means for maintaining adjacent containers a predetermined distance from one another includes a plurality of connectors said connectors are removably received in a predetermined number of said openings in said side walls.

16. A tray for receiving a plurality of plants comprising:

at least one elongated container; said container having two spaced apart elongated side walls; a plurality of spaced apart growing compartments for receiving plants and growing material; portions of said elongated side walls forming individual walls for each of said growing compartments; a plurality of spaced apart air compartments; an air compartment located between each of said spaced apart growing compartments; each air compartment having a top portion and a bottom portion; said top portion and said bottom portions being substantially open thereby enabling air to readily pass through said air compartments; a first barrier formed by a common wall between an air compartment and one of its adjacent growing compartments; said first barrier being constructed so as to permit airflow into said adjacent growing compartment from said air compartment thereby enabling air pruning at roots of the plant in said growing compartment; said growing compartments having a top portion and a bottom portion; said top portions and said bottom portions of said growing compartments being substantially open thereby enabling the ready removal of said plants from said growing compartments and further enabling additional air pruning of roots of the plant in said growing compartments; a second barrier formed by a common wall between said air compartment and another of its adjacent growing compartments; bridging means located in each air compartment; said bridging means contacting each of said barriers for providing stability.

* * * * *